(12) United States Patent
Sowa

(10) Patent No.: US 6,698,184 B1
(45) Date of Patent: Mar. 2, 2004

(54) THRUST CHAMBER ASSEMBLY

(75) Inventor: Armin Sowa, Ottobrunn (DE)

(73) Assignee: Astrium GmbH, Munich (DE)

( * ) Notice: Subject to any disclaimer, the term of this patent is extended or adjusted under 35 U.S.C. 154(b) by 2 days.

(21) Appl. No.: 10/009,727

(22) PCT Filed: Jun. 6, 2000

(86) PCT No.: PCT/DE00/01825
§ 371 (c)(1),
(2), (4) Date: Apr. 1, 2002

(87) PCT Pub. No.: WO00/79115
PCT Pub. Date: Dec. 28, 2000

(30) Foreign Application Priority Data

Jun. 17, 1999 (DE) .......................... 199 27 735

(51) Int. Cl.⁷ ................................ F02K 9/64
(52) U.S. Cl. .......................... 60/206; 60/257
(58) Field of Search .................. 60/257, 204, 206

(56) References Cited

U.S. PATENT DOCUMENTS 3,719,046 A   3/1973   Sutherland
5,780,157 A   7/1998   Tuffias et al.
6,151,887 A * 11/2000  Haidn et al. ................. 60/257

FOREIGN PATENT DOCUMENTS

DE   4137638 A1   6/1993
EP   0780564      6/1997
WO   96/25595     8/1996

OTHER PUBLICATIONS

Sutton, G.P. and Ross, D.M., "Rocket Propulsion Elements", John Wiley and Sons, New York, 1976, pp. 278, 297.*
Copy of the International Search Report.

* cited by examiner

Primary Examiner—Ehud Gartenberg
(74) Attorney, Agent, or Firm—Crowell & Moring LLP

(57) ABSTRACT

Thrust-chamber assembly has an expansion nozzle and a combustion-chamber wall, to which an ejector head is affixed. The part of the combustion-chamber wall adjacent to the injector head comprising a precombustion-chamber wall, in which the combustible materials delivered to the assembly first form a cooling film. There is a heat-conducting layer in at least one area of the outside of the precombustion-chamber wall and in addition, it has a covering of platinum or gold.

44 Claims, 3 Drawing Sheets

THRUST CHAMBER ASSEMBLY

BACKGROUND AND SUMMARY OF THE INVENTION

The invention concerns a thrust-chamber assembly for space rocket engines that are used particularly for adjusting the position of a satellite.

Space rocket engines have a fuel injector head through which fuel and oxidizer are injected into the thrust chamber. During operation, a film of fuel and oxidizer with a constant thickness of about 0.5 mm builds up on the inner wall of the precombustion chamber where these materials are mixed and prevents overheating of the precombustion-chamber wall. In practice, this film has proved unstable at times, causing the temperature of some areas of the precombustion-chamber wall to rise and reduce its stability.

This film, which consists of combustible materials, i.e. fuel and oxidizers, that have not yet ignited, proved unstable particularly during pulsed operation, when a considerably smaller amount of combustible material is injected into the combustion chamber than during stationary operation, as this marginal cooling film is caused to evaporate by the heat stream from either the narrowest diameter of the nozzle, which is considerably hotter, or the narrow part of the nozzle.

Some of the current documentation on this technology discusses means of dealing with high temperatures in rocket engines.

U.S. Pat. No. 3,719,046 describes how the combustion chamber of a rocket engine is surrounded by a heat-conductor containing a wick-like material saturated with a fluid, this material being located adjacent to the combustion chamber. The fluid evaporates when it absorbs heat from the combustion chamber, and the vapor is delivered to a heat exchanger, where it condensed. The fluid is then returned to the wick-like material.

WO 96/25596 describes a combustion chamber for a rocket engine with a lining of rhodium, iridium, or a rhodium-iridium alloy that is resistant to high temperatures, and also guarantees resistance to corrosion from unburned fuel elements.

However, these documents offer no solution to the problems described above, which are connected to the cooling film in space rocket engines.

The purpose of this invention is therefore to shape the thrust chamber in such a way that the combustible materials fed into the combustion chamber of a satellite engine via the injector head will be certain to form a stable and homogenous film on the inner wall of the combustion chamber in the proximity of the injector head.

The purpose of this invention is therefore to configure the combustion chamber in such a way that the combustible materials fed into the combustion chamber of a satellite engine via the injector head will be certain to form a stable and homogenous film on the inner wall of the combustion chamber in the proximity of the injector head.

This problem is dealt with using the features described in claim 1. Alternative methods are described in the sub-claims.

One advantage of the solution used by this invention is that existing forms of thrust-chamber construction remain essentially unchanged. Better operational reliability can be achieved through simple modifications.

The invention is described below using the attached figures, which illustrate the following:

Figure 1:
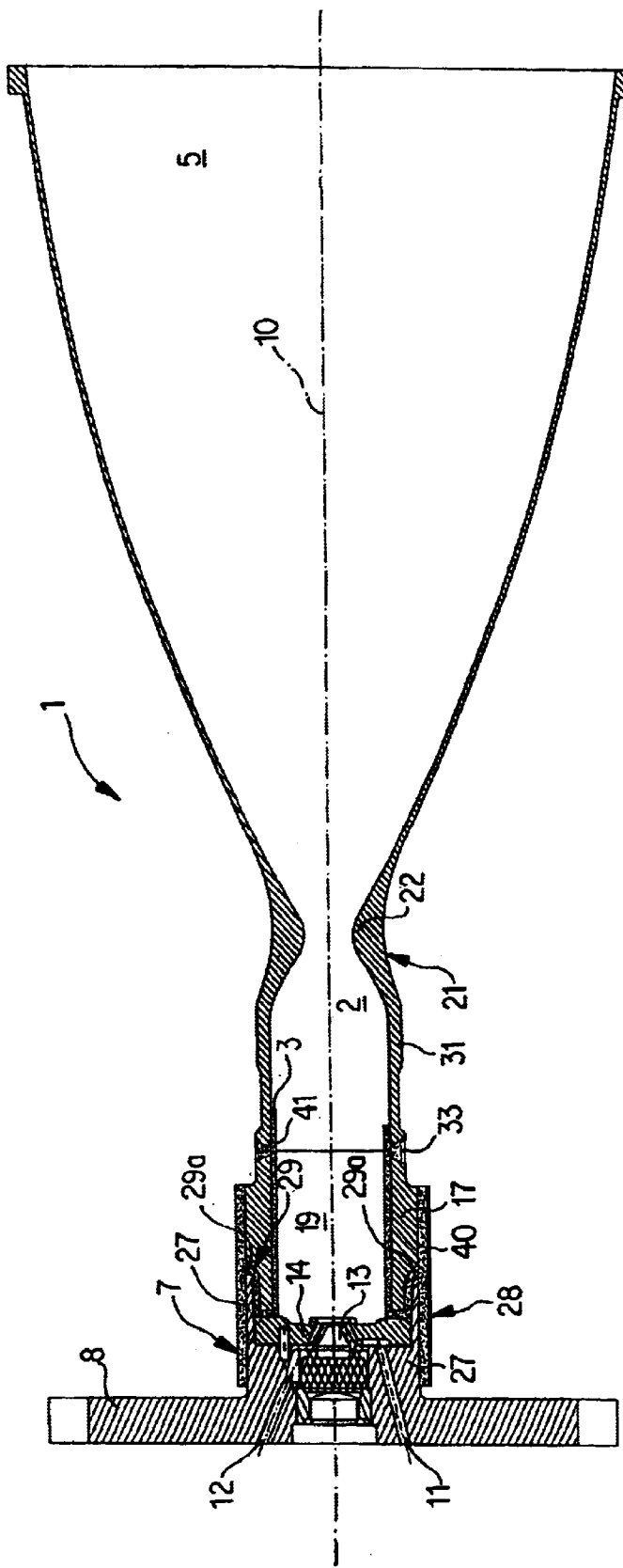
FIG. 1: a longitudinal cross-section of an assembly comprising an injector head and a thrust chamber for a satellite engine.
Figure 1A:
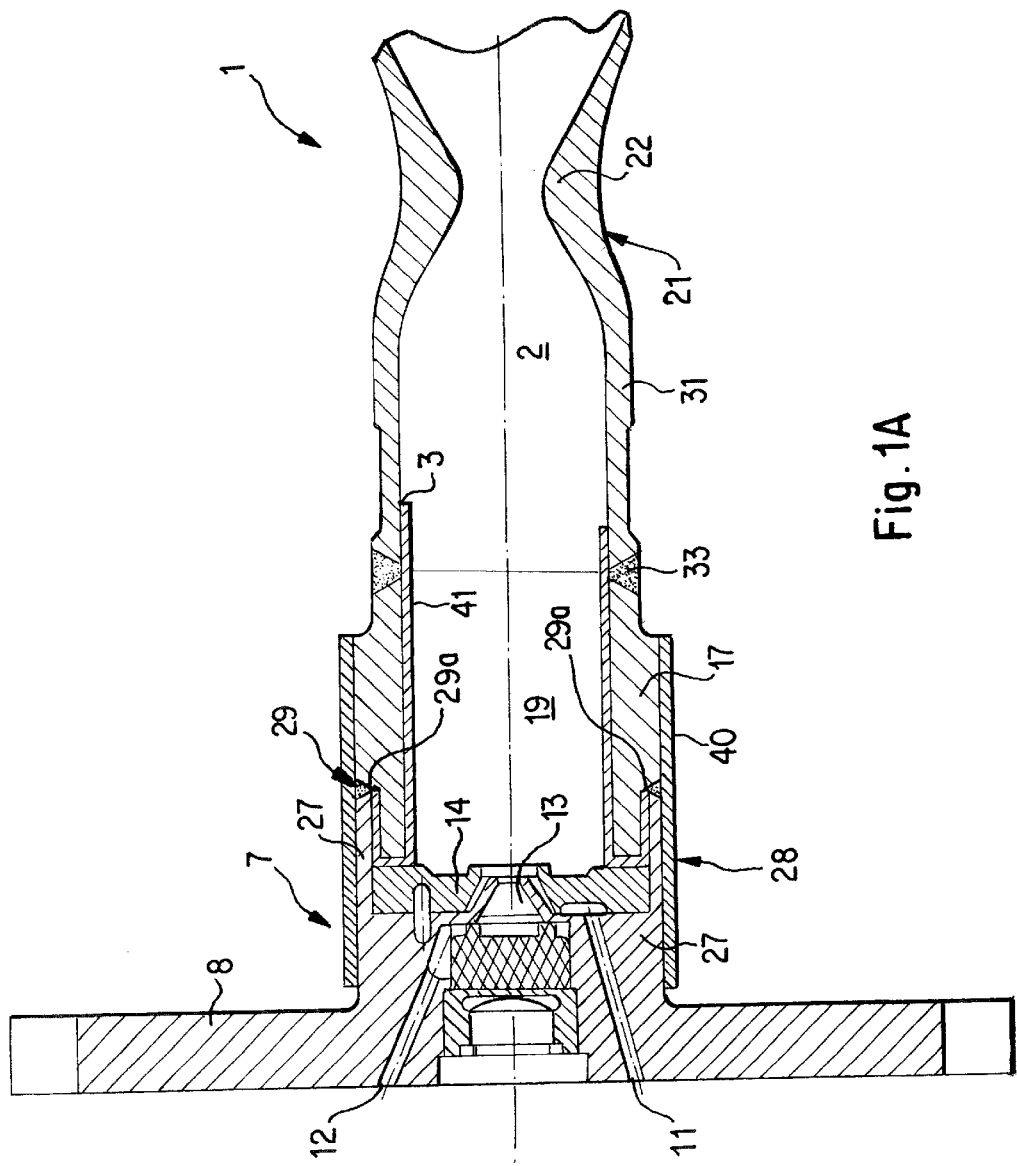
FIG. 1a is a magnified view of the injector head and adjacent chamber area illustrated in FIG. 1.

The thrust chamber assembly [1] shown in FIG. 1 comprises a combustion chamber [2] with a combustion chamber wall [3] that is continuous with an expansion nozzle [5]. Attached to the open end of the combustion chamber [3] is an injector head [7] fastened by a flange to the satellite (not shown). The flange [8] holds the fuel shut-off valve for the thrust-chamber assembly [1]. Thrust-chamber assembly 1 has an essentially rotation symmetrical form around a longitudinal axis [10].

The injector head [7] has at least one feed line for fuel [11] and at least one feed line [12] for the oxidizer. Unsymmetrical hydrazine (MMH) is the normal fuel employed, and a typical oxidizer would be nitrogen tetra oxide ($N_2O_4$). The feed lines [11, 12] terminate in the injector head [7] with the two components [13, 14].

The propellants are caused to rotate in the injector head [7], striking the combustion chamber wall [3] in conical form.

DETAILED DESCRIPTION OF THE DRAWINGS

The combustion chamber wall [3] in the proximity of the injector head [7] exhibits a precombustion-chamber wall [17], the inside of which delimits a mixing precombustion chamber [19]. The end [21] of the combustion-chamber wall [3] opposite the injector head [7] becomes narrower on the inside at the transition point [22] between thrust-chamber assembly [1] and expansion nozzle [5].

The precombustion chamber wall [17] is usually composed of chrome-nickel-molybdenum steel alloys, which can withstand temperatures between 200–800° C., and internal pressures of up to 10 bar. Chrome-nickel-molybdenum steel alloys have proven highly resistant to heat and are therefore less susceptible to wear. However, these alloys are susceptible to hot gas corrosion.

The combustion-chamber wall [3] and the cylinder-shaped end [27] of the injector head [7] overlap, one being inserted into the other. The cylinder-shaped end [27] of the injector head [7] surrounds part of the combustion-chamber wall [3]. The cylinder-shaped end [27] is connected to the corresponding point [29a] on the precombustion-chamber wall [17] by a welded joint [29]. Viewed from an axial direction, the combustion-chamber wall [3] comprises two components made of different materials. It has two parts, one is the precombustion-chamber wall [17] and the second is a part [31] of the combustion-chamber wall [3]. The precombustion-chamber wall [17] is welded to the second part [31] at point [33]. The thrust-chamber assembly 1 is provided with a heat-conducting layer [40] in at least one area of the outside of the combustion-chamber wall [3]. In addition, a heat-conducting layer [40] of this type can also be applied in at least one area on the outside of the cylinder-shaped end [27] of the injector head.

When there is a heat-conducting layer [40] on both the cylinder-shaped end [27] and the combustion-chamber wall [3] their outer surfaces take the shape of regular outlines running in an axial direction. The heat-conducting layer [40]

can also take the form of a cylindrical mantle that surrounds at least part of the cylinder-shaped end [27] and part of the combustion-chamber wall [3]. The outside of the coated area of the precombustion-chamber wall [17] has a larger outer diameter than the uncoated part of the combustion wall [3].

The heat-conducting layer [40] consists mainly of heat-conducting materials. These are usually metals, metal alloys, and ceramic materials. The heat-conducting layer usually consists of copper or beryllium or copper or beryllum alloys. The heat-conducting layer [40] is preferably applied at least in part to areas adjacent to the outside of combustion wall [3].

Some areas of the precombustion-chamber wall [17] may be coated with platinum or gold. The preferred locations for this coating are the areas between the cylinder-shaped end, [27] and the area of the precombustion-chamber wall [17] that overlaps it, in the area between the precombustion-chamber wall [17] and part [14] of the ejector head [7], and at least part of the inside of the precombustion-chamber wall facing the longitudinal axis [10]. The platinum or gold coating [41] serves to prevent oxidation of the precombustion-chamber wall [17].

The heat-conducting layer [40] in the invention leads to passive cooling of the combustion-chamber wall [3] or the precombustion-chamber wall [17]. In this way, heat created in the hottest area of the thrust-chamber assembly [1], i.e. in the narrow area [22], flows into the surrounding area of the thrust-chamber assembly [1], and in particular, toward the ejector head, thus passing on part of this heat to the fuel passing trough it.

Residual heat is radiated into space. This reduces the temperature on the inside of the precombustion-chamber wall [17]. When combustible materials are delivered to the mixing precombustion chamber [19] via the feed lines [11, 12], these materials move with a spinning motion along the inside of the precombustion-chamber wall [17] due to the alignment of the feed lines [11, 12] and the pressure under which the materials are carried, thus forming a cooling film there. Due to the heat-conducting layer [40], temperatures in the proximity of the cooling film can be kept so low, that even with pulsating operation of the engine, the film cannot evaporate. The cooling film is therefore stable. Depending on the materials used to make the precombustion-chamber wall [17], as well as other parts of the combustion-chamber wall [3] and the injector head [7], the thickness of the heat-conducting layer [40] and its location can be chosen to ensure the desired temperature in the proximity of the cooling film.

The heat-conducting layer [40] is preferably applied using a galvanic process. If the heat-conducting layer [40] is located on the outside of the cylinder-shaped end [27] of the injector head [7] or the precombustion-chamber wall [17], the layer should preferably have a thickness between 0.1 and 1.0 mm.

The heat-conducting layer [40] can also be attached using clamps, at least on the outside of the precombustion-chamber wall [17], as well as being attached to the outside of the cylinder-shaped end [27] of the injector head [7].

It is also conceivable that the addition of heat conduction pipes or copper wires will make it possible to transfer heat to other parts of the satellite system where it might be useful. This would make it possible to reduce the number of heating circuits in the total satellite system.

Figure 2:
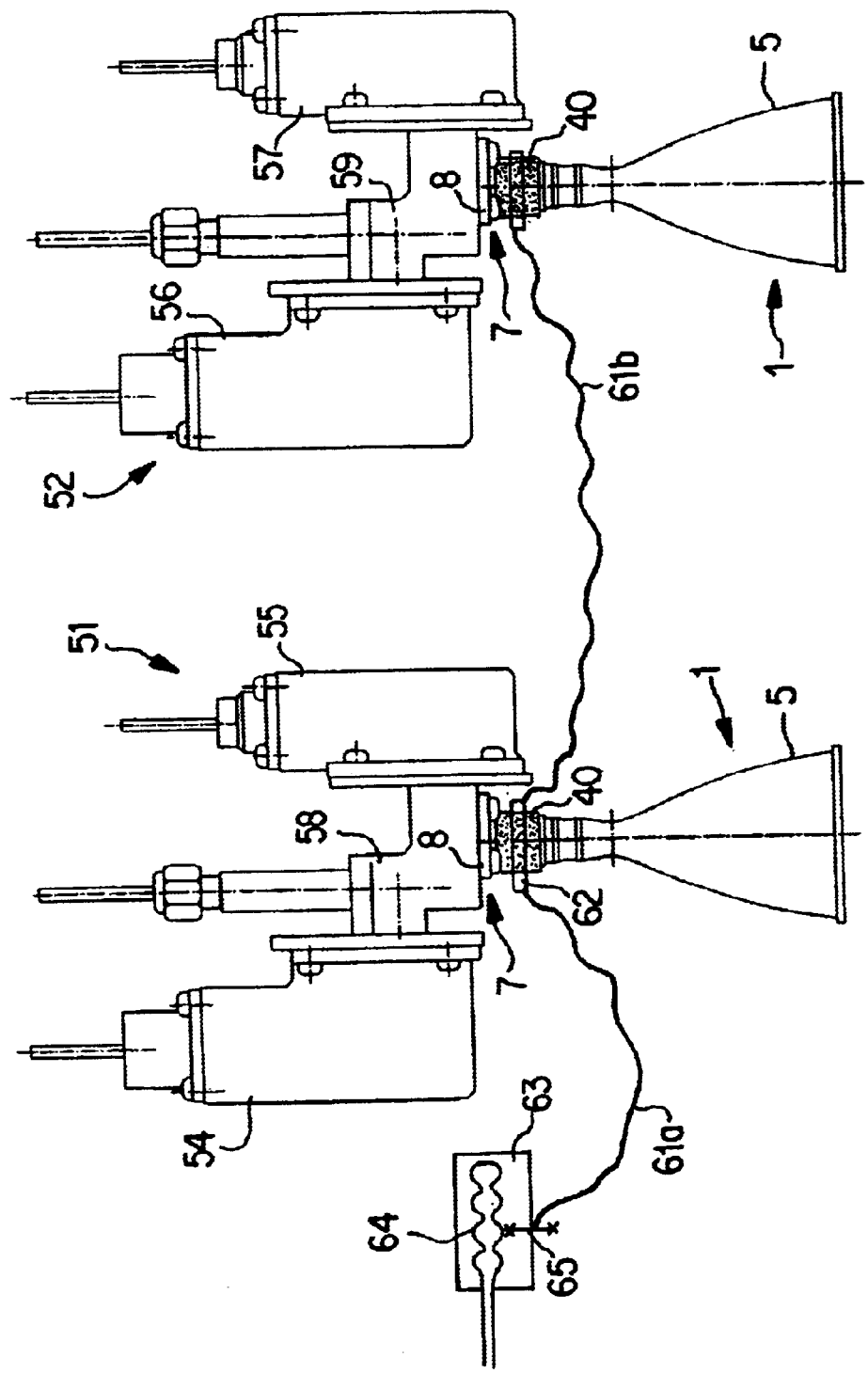
FIG. 2: assembly of two redundant engines with thrust chambers and a number of devices for utilizing the thermal energy produced in thrust chambers.

FIG. 2 illustrates an assembly to utilize thermal energy from a thrust chamber during engine operation. Components of the object illustrated in FIG. 1 that correspond in type and function to components of the object illustrated in FIG. 2 have the same reference numbers in FIG. 2 as in FIG. 1.

FIG. 2 shows a first engine [51] and a second engine [52]. These could, for example, be two redundant engines from an engine system of 16 engines, in which the first engine [51] would be active and the second engine [52] would be passive during normal operation. The first [51] and second [52] engines in FIG. 2 are illustrated schematically with two propellant shut-off valves [54, 55 and 56, 57 respectively] each of which is connected mechanically and functionally to one thrust chamber [1] via a valve body [58, 59]. In each valve body [58 or 59], there are feed lines (not illustrated) to the injector head [7], which is attached to the satellite by a flange [8]. As FIG. 1 also illustrates, the thrust chamber [1] is attached to the flange [8]. The heat-conducting layer [40] surrounds at least part of the cylinder-shaped end [27] of the injector head [7], and at least part of the precombustion-chamber wall [17].

In the assembly shown in FIG. 2, a first heat-conducting wire [61a] and a second heat-conducting wire [61b] are attached to a point on the heat-conducting layer [40]. In order to attach the heat-conducting wires [61a, 61b] to the heat-conducting layer, current technology provides for a clamp or clip connection [62], for example. However, this connection could also be galvanically integrated into the heat-conducting layer [40]. In that case, there could be an appropriate handle attached to the heat-conducting layer [40], at one end of which the heat-conducting wire [61a or 61b] could be attached. The heat-conducting wires [61a, 61b] connect the heat-conducting layer [40] of the first engine [51] with the outside of a heat-consuming component or a satellite component [63] with a heating element, or with the heat-conducting layer [40] of the second engine [52]. The connection to a heat-consuming component or a further heat-conducting layer [40] via heat-conducting wires [61a, 61b] is only one example. A heat-conducting layer [40] could also be connected via heat-conducting wires to several other heat-conducting layers [40] and/or several components that consume heat [63]. The heat-consuming component [63] in FIG. 2 shows a heating coil [64] to heat technical equipment or other components of a space vehicle. A fastening point or heat-transfer surface [65], which could be a clamp or a screw connection, connects the first heat-conducting wire [61a] to the heat-consuming component [63] and conducts the thermal energy flowing through heat-conducting wire 61a to the heat-consuming component [63].

During operation of the first engine [51], for example, there would normally be a temperature of 100–300° C. in the heat-conducting layer. In the assembly shown in FIG. 2, the second engine [52] is a redundant engine that remains passive as long as the first engine [51] is in operation. If the first engine [51] malfunctions, the second engine [52] is activated by control signals. It must be assured that the second engine [52] can start operation immediately in the event of a change over. This requires that the fluids in the engine area be at a temperature between 0 and 40° C. prior to ignition of the second engine. This temperature range is reached through the use of additional heating circuits located at the corresponding sites in the engines [51, 52].

With this invention, the thermal energy that is released in the thrust chamber [1] of an active engine [51], and which concentrates in a first heat-conducting layer [40], can be delivered, via a heat-conducting wire [61b], directly to a heat-consuming component [63] and/or a second heat-conducting layer [40] of a second engine [52]. The heat delivered to a heat-consuming component [63] can be used to heat a device located in the heat-consuming component or an area of the engine [51 or 52] in the proximity of the heat-consuming component [63]. The heat delivered via the heat-conducting wire [61b] to a second heat-conducting layer [40] of an additional engine [52] heats this layer due to the heat released by the first heat-conducting layer [40]. Due to the loss of heat in space, engine components can cool to a temperature of −40° C. if they are not preheated. Because this temperature is inadmissible for the operation of many devices, this invention serves to ensure engines operational readiness.

The advantage of exploiting the thermal energy released in the thrust chamber [1] of an active engine [51 or 52] is that the passive engine can then be pre-heated without any additional expenditure of energy, or only very small additional expenditure, via a heat-consuming component [63] or via a direct connection to the invention's heat-conducting layer [40]. This is almost certainly available during switchover processes. With an assembly produced on the basis of this invention, as shown in FIG. 2, no energy, or only a relatively small amount of energy from the thermal control system of the satellite is needed to preheat such engines.

In general, the thermal energy removed by a heat-conducting layer [40] can also be utilized by other heat-consuming devices of a satellite, for example for its fuel lines.

What is claimed is:

1. Thrust-chamber assembly with an expansion nozzle and a combustion-chamber wall, to which an injector head is affixed, a part of the combustion-chamber wall adjacent to the injector head comprising a precombustion-chamber wall, in which the combustible materials supplied to the assembly first form a cooling film, the assembly being characterized by a heat-conducting layer being applied in at least one area of the outside of the precombustion-chamber wall and covering at least part of an area on the outside of a cylindrical end of the injector head which is continuous with the precombustion-chamber wall.

2. Thrust-chamber assembly according to claim 1, characterized by the heat-conducting layer being made of metal.

3. Thrust-chamber assembly according to claim 2, characterized by the heat-conducting layer being made of copper.

4. Thrust-chamber assembly according to claim 3, characterized by the heat-conducting layer being applied galvanically.

5. Thrust-chamber assembly according to claim 1, characterized by the heat-conducting layer having a thickness between 0.1 and 1.00 mm.

6. Thrust-chamber assembly according to claim 2, characterized by the heat-conducting layer being made of beryllium or a beryllium alloy.

7. Thrust-chamber assembly according to claim 2, characterized by the heat-conducting layer being composed of a ceramic material.

8. Thrust-chamber assembly according to claim 1, characterized by the heat conducting layer being attached by a clamp to the outside of the precombustion-chamber wall.

9. Thrust-chamber assembly according to claim 8, characterized by the heat-conducting layer also being attache to an area on the outside of the cylindrical end of the ejector head.

10. Thrust-chamber assembly according to claim 1, characterized by a protective layer against oxidation that covers at least part of the inside of the precombustion-chamber wall, the narrow end of the precombustion-chamber wall between the precombustion-chamber wall and the ejector head, and at least part of the outside of the of the precombustion-chamber wall.

11. Thrust-chamber assembly according to claim 10, characterized by a protective layer made of platinum or gold.

12. Thrust-chamber assembly according to claim 11, characterized by a galvanically applied protective layer.

13. Thrust-chamber assembly according to claim 1, characterized by the heat released from the heat-conducting layer being delivered by heat-conducting elements to other areas of the satellite system, in order to preheat them.

14. A rocket engine thrust chamber assembly comprising:
a precombustion chamber with a precombustion chamber wall,
an injector head opening to the precombustion chamber and operable to inject combustible materials to the precombustion chamber,
a main combustion chamber with a main combustion chamber wall,
said main combustion chamber being adjacent to and downstream of the precombustion chamber,
an expansion nozzle disposed downstream of the main combustion chamber, and
a heat conducting layer disposed on the precombustion chamber wall at a side thereof facing away from the precombustion chamber wall,
wherein said precombustion chamber wall includes a cylindrical section aligned with a cylindrical section of the injector head, and wherein the heat conducting layer covers at least a portion of the cylindrical section of the injector head.

15. A rocket engine thrust chamber assembly according to claim 14, wherein the heat conducting layer is a cylindrical layer which extends along outside surfaces of the cylindrical section of the injector head and of the cylindrical section of the precombustion chamber wall.

16. A rocket engine thrust chamber assembly according to claim 14, wherein the heat conducting layer is made of metal.

17. A rocket engine thrust chamber assembly according to claim 16, wherein said metal is copper.

18. A rocket engine thrust chamber assembly according to claim 17, wherein the heat conducting layer has a thickness of between 0.1 mm and 1.0 mm.

19. A rocket engine thrust chamber assembly according to claim 14, wherein the heat conducting layer is made of metal.

20. A rocket engine thrust chamber assembly according to claim 15, wherein the heat conducting layer is made of metal.

21. A rocket engine thrust chamber assembly according to claim 20, wherein said metal is copper.

22. A rocket engine thrust chamber assembly according to claim 21, wherein the heat conducting layer has a thickness of between 0.1 mm and 1.0 mm.

23. A rocket engine thrust chamber assembly according to claim 16, wherein the heat conducting layer is made of one of beryllium and beryllium alloy.

24. A rocket engine thrust chamber assembly according to claim 19, wherein the heat conducting layer is made of one of beryllium and a beryllium alloy.

25. A rocket engine thrust chamber assembly according to claim 20, wherein the heat conducting layer is made of one of beryllium and beryllium alloy.

26. A rocket engine thrust chamber assembly according to claim 14, wherein the heat conducting layer is made of a ceramic material.

27. A rocket engine thrust chamber assembly according to claim 14, wherein the heat conducting layer is made of a ceramic material.

28. A rocket engine thrust chamber assembly according to claim 14, wherein the heat conducting layers is attached by a clamp to the precombustion chamber wall.

29. A rocket engine thrust chamber assembly according to claim 28, wherein the heat conducting layer is attached to the injector head.

30. A rocket engine thrust chamber assembly according to claim 14, wherein the heat conducting layers is attached by a clamp to the precombustion chamber wall.

31. A rocket engine thrust chamber assembly according to claim 15, wherein the heat conducting layers is attached by a clamp to the precombustion chamber wall.

32. A rocket engine thrust chamber assembly according to claim 31, wherein the heat conducting layer is made of metal.

33. A rocket engine thrust chamber assembly according to claim 14, further comprising a protective layer against oxidation which covers at least a portion of the precombustion chamber wall facing the precombustion chamber, said protective layer also covering an end of the precombustion chamber wall facing the injector head and at least a portion of the precombustion chamber wall facing away from the precombustion chamber.

34. A rocket engine thrust chamber assembly according to claim 15, further comprising a protective layer against oxidation which covers at least a portion of the precombustion chamber wall facing the precombustion chamber, said protective layer also covering an end of the precombustion chamber wall facing the injector head and at least a portion of the precombustion chamber wall facing away from the precombustion chamber.

35. A rocket engine thrust chamber assembly according to claim 34, wherein the heat conducting layer is made of metal.

36. A rocket engine thrust chamber assembly according to claim 33, wherein the protective layer is made of one of platinum and gold.

37. A rocket engine thrust chamber assembly according to claim 34, wherein the protective layer is made of one of platinum and gold.

38. A rocket engine thrust chamber assembly according to claim 33, wherein the protective layer is galvanically applied.

39. A rocket engine thrust chamber assembly according to claim 14, comprising heat conducting elements operable to transmit heat from the heat conducting layer to areas of a satellite system carrying the thrust chamber assembly.

40. A satellite comprising a plurality of rocket engine thrust chamber assemblies according to claim 14.

41. A satellite according to claim 40, comprising conducting elements operable to conduct heat from the heat conducting layer of one rocket engine thrust chamber assembly to the heat conducting layer of another of the rocket engine thrust chamber assemblies.

42. A rocket powered satellite comprising a plurality of rocket engine thrust assemblies which each include:
 a precombustion chamber with a precombustion chamber wall,
 an injector head opening to the precombustion chamber and operable to inject combustible materials to the precombustion chamber,
 a main combustion chamber with a main combustion chamber wall,
 said main combustion chamber being adjacent to and downstream of the precombustion chamber,
 an expansion nozzle disposed downstream of the main combustion chamber, and
 a heat conducting layer disposed on the precombustion chamber wall at a side thereof facing away from the precombustion chamber.

43. A satellite according to claim 42, comprising conducting elements operable to conduct heat from the heat conducting layer of one rocket engine thrust chamber assembly to the heat conducting layer of another of the rocket engine thrust chamber assemblies.

44. A method of operating the rocket powered satellite of claim 43 comprising:
 operating one of the rocket engine thrust assemblies while another of the rocket engine thrust assemblies is inoperative, with said conducting element transferring heat to the heat conducting layer of said inoperative thrust assembly so as to improve subsequent operation of the inoperative thrust assembly in the event of failure of the operating thrust assembly.

* * * * *